No. 678,879. Patented July 23, 1901.
D. HILL.
CULTIVATOR.
(Application filed Aug. 28, 1900.)
(No Model.) 3 Sheets—Sheet 1.
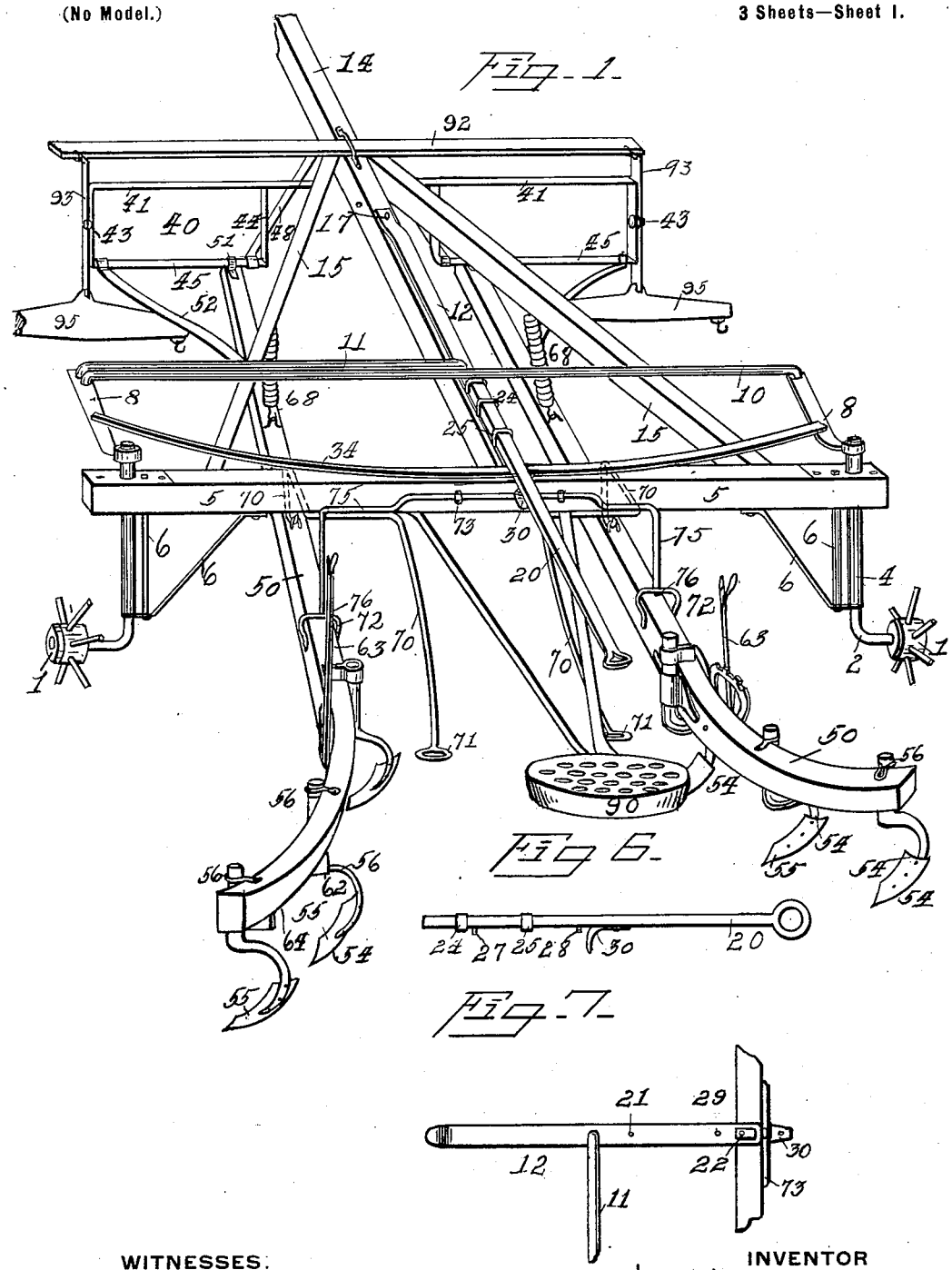
WITNESSES:
E. E. Cady
J. H. Lane
INVENTOR
Daniel Hill
BY
M. M. Cady
ATTORNEY.

No. 678,879. Patented July 23, 1901.
D. HILL.
CULTIVATOR.
(Application filed Aug. 28, 1900.)

(No Model.) 3 Sheets—Sheet 2.

No. 678,879. Patented July 23, 1901.
D. HILL.
CULTIVATOR.
(Application filed Aug. 28, 1900.)
(No Model.) 3 Sheets—Sheet 3.
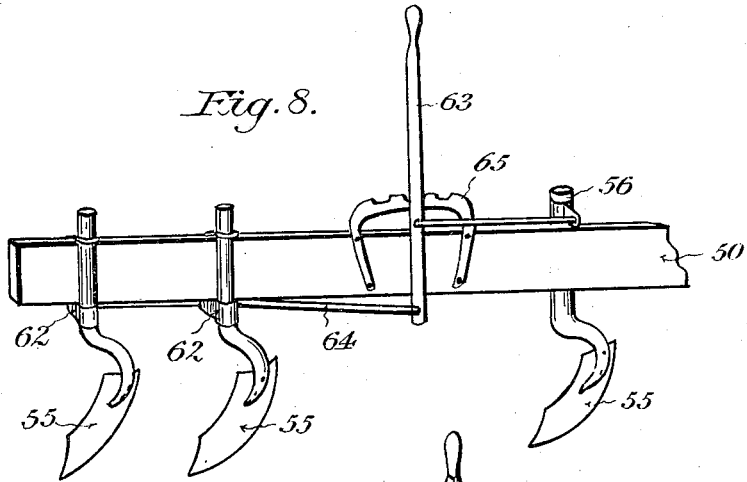
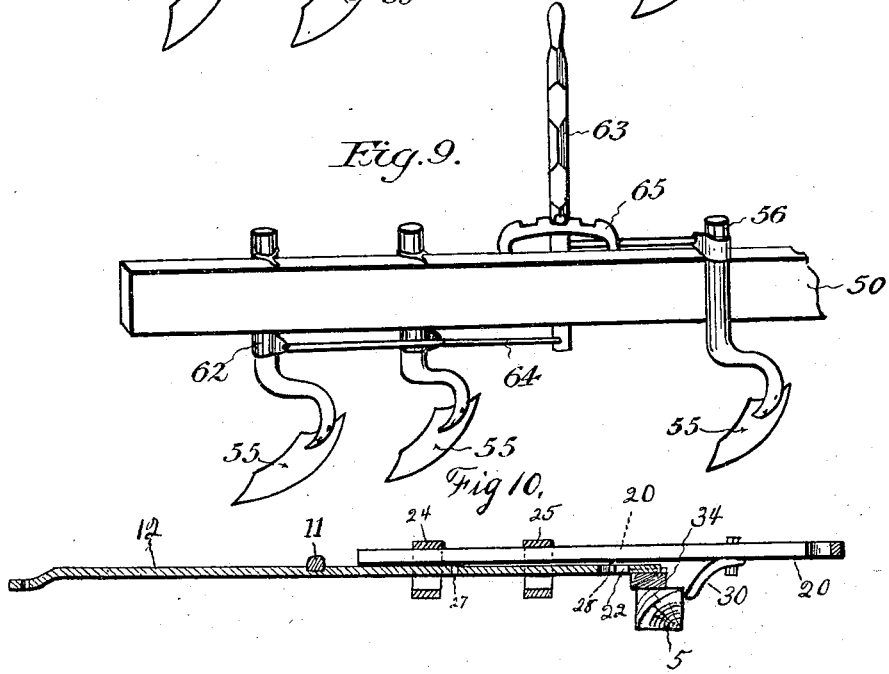
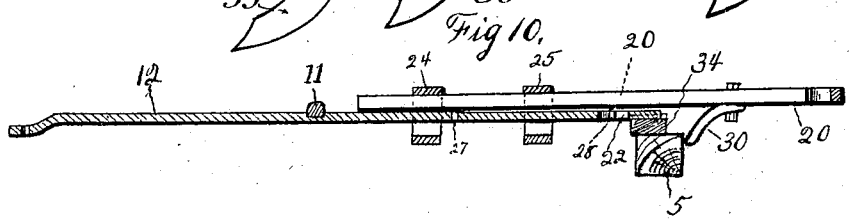
WITNESSES: INVENTOR
Daniel Hill
BY
ATTORNEY.

UNITED STATES PATENT OFFICE.

DANIEL HILL, OF GRAFF, IOWA.

CULTIVATOR.

SPECIFICATION forming part of Letters Patent No. 678,879, dated July 23, 1901.

Application filed August 28, 1900. Serial No. 28,334. (No model.)

*To all whom it may concern:*

Be it known that I, DANIEL HILL, a citizen of the United States, residing at Graff, in the county of Dubuque and State of Iowa, have invented certain new and useful Improvements in Cultivators; and I do hereby declare the following to be a full, clear, and exact description of the invention, such as will enable others skilled in the art to which it appertains to make and use the same.

Great difficulty is experienced in the cultivation of corn and other plants, especially that growing on side-hills, where it is desired to throw the soil in the lower side of the row upward toward the corn and the soil in the upper side of the row away from the corn. A further difficulty arises in avoiding the plowing up of the hills of corn where they have not been planted in substantial squares, and this is found to be especially difficult in what is known as "cross-plowing" or "cultivating." To overcome these difficulties is one of the objects of my invention.

The other features and objects will be developed hereinafter in the following specification and illustrated in the accompanying drawings, forming a part hereof, and in which—

Figure 1 is a perspective of my invention. Fig. 2 is a rear view of the frame and wheels and attachments. Fig. 3 is a front view showing draft and attachment of plow-beam. Fig. 4 is a perspective of one of the shovels and mode of attachment to a plow-beam. Fig. 5 is a side elevation of a plow-beam with shovel attached and the lever for operating the shovels. Fig. 6 is a perspective of one part of a lever for guiding the plow. Fig. 7 shows a view of another part of the same lever as shown in Fig. 6. Fig. 8 is a perspective of a plow-beam with the shovels attached, showing the means for operating the shovels. Fig. 9 is a view of the opposite side of Fig. 8. Fig. 10 is a longitudinal section of the plate and lever locked together.

Like numerals of reference denote corresponding parts in each of the drawings.

In the description, 1 represents the wheels, and 2 their axles, one for each wheel. The axles are each supplied with a collar 4, which is set in or near the end of a cross-bar 5 of the frame. Through this collar passes the axle. These collars are further supplied with braces 6, which are firmly bolted to the under side of the cross-bar 5 and extend down and clasp around the axles 2 beneath the ends of the collar 4 and both sustain the collar and form rigid braces for the axles. To the top of each collar is rigidly fastened an arm 8, which is clasped around the top of the axles and by which the wheels are deflected. These arms are connected together at their outer ends by a bar 10, and the lever on the left side is connected also to a plate 12, attached to the tongue, the object of which will presently appear.

The tongue 14 is of ordinary construction, with the stay-bars 15, and both tongue and stay-bars are rigidly fastened to the cross-bar 5 and form together the frame of the cultivator. To the top of the tongue is pivoted a metal plate 12 by the pivot-pin 17. This plate 12 extends along the top of the tongue to near the cross-bar 5 and is supplied with holes 21 29 and slot 22. To the plate 12 is removably attached a lever 20 by loops 24 and 25, secured to the lever 20. The lever is also provided with pins 27 and 28 and clip 30, the object of which will presently appear. A plate 34 in the form of an arc of a circle is fastened to the top of the stay-bars 15 and cross-bar 5, on which the plate 12 is caused to travel by the lever 20. There is also cut a notch 35 in the center of said plate, with which the end of the plate 12 engages to lock the wheels.

The lever 20, with the pins and loops attached, is brought into engagement with the plate 12 by raising the plate and sliding it through the loops till the pin 27 coincides with and enters the hole 21, and pin 28 coincides with and enters the slot or hole 22 and the clip 30, against the end of the bar 5. In this position the lever and plate 12 are united to form a single lever, and in this position both the lever and plate are locked and prevented from turning either to the right or left, and the wheels are also locked to prevent any deflection in the line of travel. By raising the lever 20 till the pin 28$^b$ is withdrawn from the slot 22 and the pin 27 from the hole 21 the lever 20 may be extended till the pin 27 enters the hole 29. Then by lifting the lever 20, and with it the plate 12, and turning the lever to the right or left the wheels, by their connection with the lever, may be turned to the right or left, and thus guide the plow-beams without changing the direction of the travel of the team. Beneath the juncture of the tongue with the stay-bars 15 is rigidly secured a frame 40, consisting of a horizontal bar 41, bent into a square at each end and forming the sides 43 44 and cross-bar 45. It is also provided with the stays 48. To the cross-bar 45 are attached the plow-beams, presently to be described.

The plow-beams consist of bars of steel bent outwardly at their outer ends and attached to the bars 45 by loops 51 and rigidly prevented from lateral movement by strong stay-rods 52 in such a manner that they can be raised and lowered at their outer ends, but not moved laterally. It is of importance that these beams 50 shall not be allowed lateral movement, as will presently appear.

The shovels 54, which are attached to the beams 50, consist of a blade 55 and standard 56. The blade is rigidly secured to the standard in any well-known manner, and the standard is preferably bent in such a manner that the top of the standard shall stand directly over the point of the blade.

For the purpose of fastening the shovels 54 to the beams there is bolted to the side of the beam a plate 58, cast with a raised portion or loop 60, through which the standard 56 is inserted and loosely held and in which it is pivoted. By this mode of pivoting the shovels on the beam it will be seen that each shovel can be turned to point in various directions without any lateral movement of the beam, as shown in Fig. 4.

For the purpose of operating the shovels and directing their course in the field there is rigidly attached to each of the shovel-standards a clamp 62. For convenience this clamp is attached to the standard of the forward shovel above the beam and to the standards of the rear shovels beneath the beam. These clamps 62 are connected to a common lever 63 by connecting-bars 64. To the side of each beam is secured a sector-shaped plate 65. The lever 63 for operating the shovels of each beam is provided with the usual spring actuating-dog 66, which engages with the teeth of the plate 65. It will be seen that by moving the lever 63 backward or forward the direction of the points of the shovels may be changed, so that the soil may be turned up against the corn from the lower side of the row and away from the corn on the upper side of the row in side-hill cultivating, and on level ground the soil may be turned in any direction at will and the plow-beams not be moved laterally.

As there is a lever attached to each beam, the operator can turn the shovels in one direction on one beam and in another direction on the other beam at the same time. He can also avoid plowing up a hill of corn which happens to be planted outside of a line of the other corn in the same row. In fact, by pivoting the shovels in this manner on each beam and supplying each beam with an independent lever the operator has absolute control of the shovels and can turn them in such direction as will best subserve his purpose in the field and meet the numerous contingencies as they arise in actual work in the field.

The reason for securing the plow-beams 50 to the bar 45 in such a manner that there will be no lateral movement of the beams will now be apparent. If the beams were pivoted or loosely attached at their forward ends, as soon as the shovels were turned to point in a line outside of a line parallel with the direction of the cultivator the beams would have a tendency to be drawn into a line parallel with the travel of the shovels and into a line parallel with the direction of the draft, and the object sought by my invention could not be accomplished. When, however, the beams are so hung that they cannot be deflected laterally, the soil can be turned in any direction desired by simply turning the direction of the shovels, as the beams are prevented from following the direction of the shovels by the mode of attachment at their forward ends.

For the purpose of raising and lowering the plow-beams coiled springs 68 are secured to the under side of the stays 15 and the top of the beams 50. These springs are of sufficient tension to about counterbalance the weight of the beams. To each beam is also attached a bent lever 70, which extends upward and is pivoted to the cross-bar 5 and then is bent downward and slightly backward and terminates at the bottom in a foot-rest 71. On these rests 71 the driver presses his feet and controls all of the vertical movements of the plow-beams and the individual vertical movement of each beam.

For holding up the plow-beams in traveling to and from the field and also in turning, a stirrup 72 is bolted to the top of each beam, and to the cross-bar 5 is suspended by staples 73 a bent-rod 75, the lower ends of which terminate in hooks 76 and are adapted to engage the stirrups 72 and hold the plow-beams up. To keep the hooks out of engagement with the stirrups, there is set in the rear of the cross-beam 5 a coiled spring, (not shown,) which presses outwardly against the rod 75, forcing it out at the top and holding the hooks away from engagement with the stirrups. To hold and lock the hooks in engagement with the stirrups, there is fastened to the under side of the lever 20 a clip 30, and the operator has only to push in the lever 20 till the clip 30 impinges against the rod 75 and forces it back against the bar 5, and this will lock the rod 75 with the hooks 76 in engagement with the stirrups 72 and, as set out above, will lock the wheels and prevent them from turning in any side direction.

It will be noticed that the levers 20, 63, and 70, with the foot-rests 71, are all situated at convenient places in easy access to the driver seated upon the seat 90 and where if the soil be dry and hard he can force the shovels into the ground by standing on the plow-beams and if the soil be light or moist can hold up the beams by resting his feet in rests 71.

Such construction as set out above necessitates attaching the plow-beams a considerable distance in advance of the cross-bar 5, and by the attachment being so far forward there is transferred an excessive weight upon the necks of the team. To relieve, in part, this pressure and to equalize somewhat the draft, I have devised the following mode of applying the draft and still maintain a sufficiently high arch of the center of the cultivator, whereby corn may be cultivated after it has reached considerable height.

On the top of the tongue, at its juncture with the stay-bars 15, is pivoted an evener 92 of about the length of the bar 5. At each end of the evener is pivoted a hanging bar 93, to the lower end of which is attached the usual whiffletree 95. The hanging bars 93 are also pivoted to the sides 43 of the frame 40, to which the beams are fastened. By this mode of construction it will be seen that the draft will be a forward and upward or lifting draft and when in the field will relieve largely the weight from the neck of the team. Further, as the driver is seated upon the seat 90, which is attached to the bar 5 and extends at some distance from the rear of said bar and only slightly raised above a plane parallel with the plane of the bar 5, he will also serve to counterbalance the weight of the forward end of the cultivator and also to relieve the team.

The following is the general mode of operation: By turning the lever 20 to the right or left the wheels are deflected and the general direction of the cultivator is determined and guided. With the levers 63 the shovels are operated to turn the soil in the direction desired, and with the foot-rests attached to the levers 70 the rear of the beams are raised and lowered. All of the detailed modes of operation and the reasons for the same have been fully shown in the foregoing specification.

Having now described my invention, what I claim, and desire to secure by Letters Patent, is—

1. In a cultivator a frame, plow-beams attached to the frame, stays secured to the plow-beams and the frame, to prevent lateral movement of the beams, shovels pivoted in each beam, and a lever secured to each beam and the shovels for operating the shovels, whereby, the points of the shovels may be turned to throw the soil in various directions, without lateral movement of the plow-beams, as and for the purposes shown.

2. In a cultivator a frame, plow-beams attached to the frame and provided with stays to prevent lateral movement of the beams, shovels pivoted in the beams, a lever for operating the shovels without lateral deflection of the beams and a lever connected to the frame and beams for raising and lowering the plow-beams, as and for the purposes shown.

3. In a cultivator a frame, sustaining-wheels pivoted in the frame, and means for changing the direction of the wheels, in combination with plow-beams attached to the frame, shovels pivoted in the beams and means for rotating the shovels, whereby, the soil may be turned to and from the corn without lateral movement of the plow-beams, substantially as described and shown.

4. In a cultivator a frame, sustaining-wheels, means for changing the direction of the wheels, plow-beams secured to the frame, stays to prevent lateral movement of the beams shovels pivoted in the beams and means connected to each beam for operating the shovels, consisting of a clamp rigidly fastened to each shovel, a lever secured to each beam, and connections between said clamps and the lever, for the purposes shown.

5. In a cultivator a frame, sustaining-wheels pivoted in the frame, a lever for deflecting the line of the travel of the wheels, plow-beams secured to the frame and provided with stays to prevent lateral movement of the beams, shovels pivoted in each beam, a lever secured to each beam and connected with the shovels to determine the direction of the shovels, independent of the beams, as and for the purposes shown.

6. In a cultivator a frame, sustaining-wheels pivoted in the frame, means for deflecting the travel of the wheels, plow-beams attached to the frame and provided with stays to prevent lateral movement, shovels pivoted in the beams, means for operating all of the shovels of each beam simultaneously, means connected to each beam for operating each set of shovels independently and levers secured to the plow-beams and the frame for raising and lowering the beams, as and for the purposes shown.

7. In a cultivator a frame, sustaining-wheels pivoted in the frame, means for deflecting the line of travel of the wheels consisting of arms secured to the axles of the wheels, connections between the arms, a lever pivoted to the frame and connected with one of said arms, plow-beams attached to the frame and stayed to prevent lateral movement of the beams, shovels pivoted in the beams, and means attached to each beam for operating the shovels consisting of a clamp secured to each shovel, a lever secured to the beam and connections between said clamps and the lever, as and for the purposes shown.

8. In a cultivator a frame, sustaining-wheels pivoted in the frame, means for deflecting the line of travel of the wheels, consisting of an arm attached to the axle of each wheel, connections between said arms, a lever pivoted to the frame and connected with one of said arms, plow-beams attached to the frame and provided with stays to prevent lateral movement of the beams, shovels pivoted in each beam and an independent lever secured to each beam for operating the shovels, as and for the purposes shown.

9. In a cultivator a frame, plow-beams attached to the frame, stays to prevent lateral movement of the beams, shovels pivoted to the beams, means for operating the shovels without lateral movement of the beams, and means for holding up and locking the beams consisting of stirrups secured to the beams, a hook attached to the frame and engaging the stirrups and a lock secured to the frame and adapted to hold the hook in engagement with the stirrups, as and for the purposes shown.

10. In a cultivator a frame, sustaining-wheels pivoted in the frame, means for deflecting the line of travel of the wheels, plow-beams suspended at their forward ends from the frame, stays connecting the frame and plow-beams, shovels pivoted in the beams, means for operating the shovels to turn the soil in various directions, without deflecting the line of the travel of the beams, a lever secured to each beam and the frame, and provided with a foot-rest for raising and lowering the beams, a hook attached to the frame and adapted to engage the plow-beam for holding up the beams, as and for the purposes shown.

11. In a cultivator a frame, sustaining-wheels, plow-beams secured at their forward ends to the frame, shovels attached to the beams, and a draft consisting of an evener pivoted to the top of the frame, hangers attached to the evener, said hangers also pivoted to the frame, and whiffletrees attached to the hangers, whereby the draft will be an upward, lifting and forward draft, as and for the purposes shown.

12. A cultivator consisting of a frame, sustaining-wheels pivoted in the frame, a lever for deflecting the line of the travel of the wheels, a seat attached to the frame, plow-beams attached to the frame, shovels pivoted in the beams, an independent lever secured to each beam for operating the shovels and a lever for raising and lowering the beam, as and for the purposes shown.

13. A cultivator consisting of a frame, sustaining-wheels, means for deflecting the line of the travel of the wheels, plow-beams attached to the frame, stays to prevent lateral movement of the beams, shovels pivoted in the beams, an independent lever attached to the beams and connected to the shovels, a lever secured to each beam and the frame and adapted to be operated by the foot of the driver for raising and lowering the beams, a hook secured to the frame for holding up the beams, and a lifting draft, substantially as described, all combined as and for the purposes shown.

In testimony whereof I affix my signature in the presence of two witnesses.

DANIEL HILL.

Witnesses:
M. M. CADY,
Ws. SAHM.